(12) United States Patent  
Susarla et al.

(10) Patent No.: US 9,471,510 B2  
(45) Date of Patent: Oct. 18, 2016

(54) SYSTEM AND METHOD FOR CACHE MONITORING IN STORAGE SYSTEMS

(71) Applicant: NETAPP, INC., Sunnyvale, CA (US)

(72) Inventors: Sai Rama Krishna Susarla, Sunnyvale, CA (US); Girish Kumar B K, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 180 days.

(21) Appl. No.: 14/136,670

(22) Filed: Dec. 20, 2013

(65) Prior Publication Data

US 2015/0178207 A1 Jun. 25, 2015

(51) Int. Cl.
G06F 12/08 (2016.01)
G06F 11/30 (2006.01)
G06F 12/12 (2016.01)
G06F 11/34 (2006.01)

(52) U.S. Cl.
CPC .......... *G06F 12/121* (2013.01); *G06F 11/3037* (2013.01); *G06F 11/3466* (2013.01); *G06F 12/0862* (2013.01); *G06F 12/0871* (2013.01)

(58) Field of Classification Search
CPC .......... G06F 12/0862; G06F 12/0871; G06F 11/3037; G06F 11/3466
See application file for complete search history.

(56) References Cited

U.S. PATENT DOCUMENTS

| 2007/0050548 | A1* | 3/2007 | Bali | G06F 12/0804 711/118 |
| 2009/0019229 | A1* | 1/2009 | Morrow | G06F 12/0862 711/137 |
| 2013/0138889 | A1* | 5/2013 | Chockler | G06F 12/0866 711/129 |
| 2013/0166846 | A1* | 6/2013 | Gaur | G06F 12/0897 711/122 |

* cited by examiner

*Primary Examiner* — Edward Dudek, Jr.
(74) *Attorney, Agent, or Firm* — Haynes and Boone, LLP (57) ABSTRACT

A system and method of cache monitoring in storage systems includes storing storage blocks in a cache memory. Each of the storage blocks is associated with status indicators. As requests are received at the cache memory, the requests are processed and the status indicators associated with the storage blocks are updated in response to the processing of the requests. One or more storage blocks are selected for eviction when a storage block limit is reached. As ones of the selected one or more storage blocks are evicted from the cache memory, the block counters are updated based on the status indicators associated with the evicted storage blocks. Each of the block counters is associated with a corresponding combination of the status indicators. Caching statistics are periodically updated based on the block counters.

19 Claims, 4 Drawing Sheets

300

| | Written | Prefetch | Hit | State | Description |
|---|---|---|---|---|---|
| 351 | 0 | 0 | 0 | Fetch | Fetched on miss, data never re-read |
| 352 | 0 | 0 | 1 | Hit | Fetched on miss, data read at least twice |
| 353 | 0 | 1 | 0 | Prefetch | Speculatively fetched, data never read |
| 354 | 0 | 1 | 1 | PrefetchHit | Speculatively fetched, read again at least once |
| 355 | 1 | 0 | 0 | WriteOnly | Written, never read |
| 356 | 1 | 0 | 1 | WriteHit | Written, read at least once |
| 357 | 1 | 1 | 0 | PrefetchUpdate | Speculatively fetched, overwritten, never read |
| 358 | 1 | 1 | 1 | PrefetchUpdateHit | Speculatively fetched, overwritten, read at least once |

Columns: 310 Written, 320 Prefetch, 330 Hit, 340 State

|   | Written | Prefetch | Hit | State | Description |
|---|---|---|---|---|---|
| 351 | 0 | 0 | 0 | Fetch | Fetched on miss, data never re-read |
| 352 | 0 | 0 | 1 | Hit | Fetched on miss, data read at least twice |
| 353 | 0 | 1 | 0 | Prefetch | Speculatively fetched, data never read |
| 354 | 0 | 1 | 1 | PrefetchHit | Speculatively fetched, read again at least once |
| 355 | 1 | 0 | 0 | WriteOnly | Written, never read |
| 356 | 1 | 0 | 1 | WriteHit | Written, read at least once |
| 357 | 1 | 1 | 0 | PrefetchUpdate | Speculatively fetched, overwritten, never read |
| 358 | 1 | 1 | 1 | PrefetchUpdateHit | Speculatively fetched, overwritten, read at least once |

SYSTEM AND METHOD FOR CACHE MONITORING IN STORAGE SYSTEMS

TECHNICAL FIELD

The present disclosure relates generally to computing systems, and more particularly to cache monitoring in storage systems.

BACKGROUND

In a computing environment using distributed or shared storage, computer storage may be provided to one or more users or applications using a highly abstracted infrastructure. This means that the characteristics and locations of the disk drives, storage arrays, and servers where the actual storage takes place are typically hidden from the user or application accessing the storage. The user or application accesses the distributed storage by referencing its symbolic or virtual location, and the distributed storage system automatically translates the virtual location into a physical location where the requested storage is actually stored and forwards the storage request to the physical device at that location. This allows the vendor providing the storage to exercise extensive flexibility in deciding how and where to implement the storage as the distributed storage system may simply change how it translates the virtual location requested by the user or application. This includes the ability to move storage from one storage device to another to address capacity, workload, and/or other requirements. These changes in implementation details are often hidden or transparent from the application or the user, which access the storage by making storage requests using an interface, such as an application programming interface (API), and providing the virtual location information for the requested storage. These virtualized and/or abstracted features of distributed storage systems may make them useful in cloud computing systems.

And while distributed storage provides great flexibility to the storage provider, it often comes with some cost to the application or user. For example, distributed storage is typically accessed over a network, such as the Internet. This may add significant overhead to storage requests as both the storage request and the response to the storage request may travel across the network. At a minimum this introduces latency or delay in the handling of the storage requests. As the storage system is being used to handle storage requests, one or more of the components and/or systems between the client or host where the storage request originates and the storage device where the storage request is ultimately handled may introduce unexpected delay and/or introduce a bottle neck in the handling of the storage requests. For example, when storage requests are transmitted using a low bandwidth and/or heavily overloaded network connection, this may introduce undesirable, but possibly avoidable, delay in the handling of the request. As another example, when a storage device, such as a disk drive, in the storage system receives a large number of storage requests over a short period of time, the processing of these requests may be undesirably delayed. Given the complexity of the distributed storage system, it is not generally a simple task to determine when, where, and/or why undesirable delays are being introduced into the handling of storage requests. To begin to answer this question, each of the various components and/or systems are typically monitored.

A subsystem often used to reduce the delay in the handling of storage requests is a cache or caching system. Caching systems are based on the general observation that once a storage request is made for a particular storage block, a follow-up request within that same storage block is more likely than not to occur in the near future. To take advantage of this, a higher speed storage device is installed somewhere in the processing path between the client or host where the storage request originates and the storage device where the storage request is ultimately handled. In some distributed storage systems there may be multiple caches or caching systems at different points along the processing path. Memory in the caching system is used to store data associated with recent storage requests as one or more cache blocks so that follow-up requests to the same storage block may be more rapidly handled by accessing the cache blocks, rather than involving a generally slower read and/or write operation on a storage device as well as a potentially latency inducing round trip across the network. As storage requests are processed they are typically routed through the caching system. When the caching system receives the storage request, the memory in the caching system is checked before forwarding the storage request for further handling.

In some caching systems, the speculative caching of storage blocks also occurs. Speculative or prefetch caching is based on the further observation that once a storage request is made for a particular storage block, a follow-up request to storage blocks that are after the particular storage block in the virtualized address space for the same storage volume is likely to occur in the near future. For example, when a request is made for the third storage block of a storage volume, there is generally a high likelihood that a request to the fourth storage block of the storage volume may be made in the near future. In some caching systems the prefetch caching may be accommodated using a resource-available approach where prefetching occurs when the other components or subsystems have capacity to handle the prefetch requests.

Caching systems are typically monitored to determine how well they are operating. One common caching metric is hit rate. The hit rate measures the ratio of storage requests that may be satisfied using the caching system to the total number of storage requests. In some caching systems the hit rate may be monitored for individual tenants or users of the storage system such as particular clients and/or storage volumes. For many caching systems, the hit rate may be 90% or higher indicating that 90% or more of the storage requests may be handled without forwarding the storage request to another storage device. A low hit rate, however, indicates little more than the hit rate is low and generally provides no indication as to why it might be low. From the low hit rate alone it is not possible to determine whether the hit rate is below because of a poor cache configuration, an unfortunate sequence of storage requests, and/or contention among multiple tenants in the use of the caching system.

Caching systems employing prefetching may also monitor their activities. This may include monitoring a number of storage blocks prefetched and/or a ratio of the number of storage blocks prefetched relative to the number of storage requests. Both of these metrics, however, provide little to no insight on whether the prefetched storage blocks are improving the hit rate for the caching system or whether they may be consuming storage system resources without improving the hit rate.

Accordingly, it would be desirable to provide improved monitoring of caching systems.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Caching systems typically provide an important function in distributed storage systems. By placing one or more caching systems along the processing path used to handle storage requests, it is often possible to improve the responsiveness of the storage system to storage requests. This is effective because when the caching system satisfies the storage request the overall processing time for the storage request may be significantly reduced. For example, when a read request is made and the data requested is already stored in the caching system, the data may be supplied from the caching system rather than sending the read request to a potentially distant disk drive and then wait for the comparatively slower disk drive to read the data from the disk drive. When the storage request is satisfied using the caching system this is called a cache hit. When the storage request is not satisfied using the caching system this is called a cache miss. Well-designed caching systems may often have cache hits on over 90% of their storage requests.

The caching system obtains the high hit rate by keeping copies of data associated with previous storage requests and in some cases may prefetch data immediately after data requested in the previous storage requests. For example, when an application is reading data from a file and requests a first part of the file, it is also likely that the application may subsequently read from the first part of the file as well as from a second part of the file that follows the first part of the file. One way of measuring the effectiveness of a caching system is to look at the hit rate for the caching system with the general understanding that a low hit rate suggests that the caching system is not being as effective as it could be in improving the performance of the storage system. Unfortunately, by itself, the hit rate does not tell anything more about why it is low or suggest how the caching system might be adjusted to increase the hit rate to a more desirable level. Similarly, measuring the number of prefetches or the ratio of the number of prefetches to the number of total storage requests do not indicate whether the prefetching is being effective or not. Caching systems, especially those in distributed storage systems, often provide caching for more than one tenant or purpose. For example, the same caching system may cache data for multiple applications requesting data or on behalf of multiple storage devices or volumes whose data is being cached. The hit rate and the prefetch measures do not provide a convenient way of telling whether the caching system is more effective for some tenants and less effective for other tenants.

Various embodiments provide useful measures of the effectiveness of a caching system, which in some instances may be implemented without significantly burdening the caching system. This involves collecting additional data about the caching system as it operates as well as dividing the data among the various tenants using the caching system.

As one example, knowing information about how much of the storage in the caching system is being used by each of the tenants may be helpful in determining whether the caching system is seeing balanced usage among the tenants or whether there is an imbalance between the tenants. This may provide insight on whether the responsiveness of the storage system may be increased by changing the distribution of storage system resources.

As another example, the effectiveness of the caching system may evaluated by keeping track of how each of the blocks of data in the caching system is being used. Blocks may be placed in a caching system in one of three ways. First, a block may be added to the caching system following a read request that results in a cache miss. The data read from the storage system following the cache miss is stored in the caching system. Second, a block may be added during a write request where the written data is stored in the caching system before being written the rest of the storage system. Third, a block may be added as part of a speculative or prefetch read following a previous read request that resulted in a cache miss or a write request. The blocks typically remain in the caching system until evicted or removed as a result of a later read request with a cache miss, a write request, or a prefetch read. This is because the caching system has a limited storage capacity, due to the generally higher cost of the faster storage used therein, and may generally keep blocks that are recently used and evict blocks that have not been used recently.

A suitable time for evaluating whether the caching system is effective is when a block is evicted from the caching system. This may be done by keeping track of three items for each block: whether the block was ever the subject of a write request, whether the block was prefetched, and whether the block was ever the subject of a read request after being added. These three items may be stored with the rest of the data identifying the block and may be quickly updated when the block is added to the caching system and each time the block is accessed while it is cached. When the block is evicted, the three items may be checked and used to increment a corresponding counter. By periodically comparing the various count values over a known time period, it is possible to obtain useful information about the usage of each block. This may be used to evaluate whether prefetching is helpful, how write requests are managed, and/or the like. Further, if an identifier associated with the tenant for the block is also recorded, the counts may be kept separately for each tenant and be used to suggest whether different tenants would benefit from having their storage requests cached differently. The tenant identifier may be further used to determine how many blocks are being cached for each of the tenants during each time period.

Figure 1:
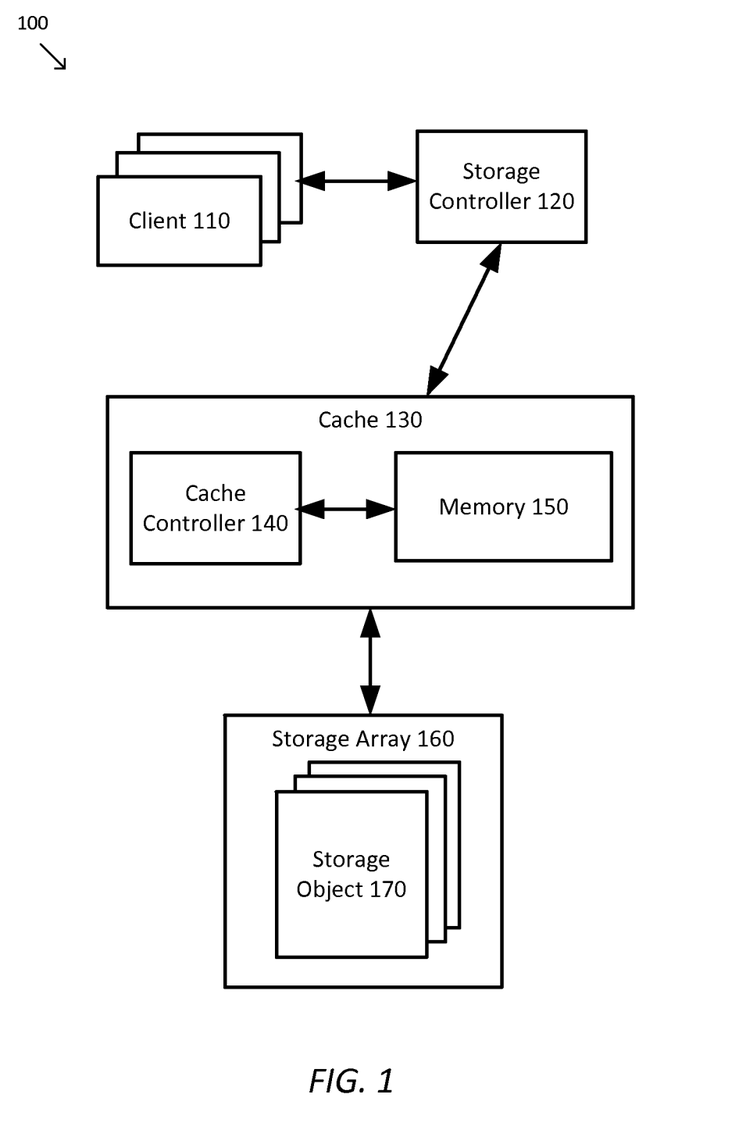
FIG. 1 is a simplified diagram of an example distributed storage system according to some embodiments.

FIG. 1 is a simplified diagram of an example distributed storage system 100 according to some embodiments. As shown in FIG. 1, storage requests originate from one or more clients 110. The clients 110 may include one or more applications and/or software packages that make storage requests. These clients 110 may include user applications, service applications, maintenance applications, operating system services, and/or the like. As each of the clients 110 makes storage requests it typically does so through a storage API, remote procedure call, a web services call, etc. that provides access to a driver stack. The storage API and driver stack provides the clients 110 with access to storage, wherever it may be located in a storage system, using an interface that abstracts the details regarding the location and the devices that implement the storage. In many cases, the storage requested is identified by a storage unit identifier, such as a logical unit number (LUN), and a virtual address, such as a block number, that are included in each storage request made by the clients 110. The clients 110 may each be located in one or more computers, hosts, servers, virtual machines, and/or other computing devices that may share and/or access their own storage API and driver stack.

Each of the storage APIs and driver stacks may use cabling or one or more networks to access a storage controller 120. Storage controller 120 may receive storage requests originated by the clients 110 and forward those storage requests to one or more storage devices that are associated with the storage unit identifier included in the respective storage request. Storage controller 120 may be located in its own computing device/server or may be included in the same computing device hosting one or more of the clients 110. Storage controller 120 may also be operated out of a cluster of computing devices.

As the storage requests are being forwarded to the storage devices, they may be passed through a caching system 130. Caching system 130 includes a cache controller 140 coupled to memory 150. Operation of caching system 130 is managed by the cache controller 140 which may include one or more processors. The one or more processors may each be central processing units, multi-core processors, microprocessors, microcontroller, field programmable gate arrays (FPGAs), application specific integrated circuits (ASICs), and/or the like. Cache controller 140 may be implemented using software or a combination of hardware and software. For example, caching system 130 may be implemented as a stand-alone subsystem and/or board added to a computing device. The computing device may be a stand-alone computing device, part of a cluster, or a virtual machine.

Memory 150 may be used to store software executed by the cache controller, one or more data structures used during operation of caching system 130, as well as data blocks being cached by caching system 130. In some examples, the data structures may include a collection of cache control blocks (CCBs) used to keep track of the data blocks being cached by caching system 130. In some cases, different types or areas of memory 150 may be used for each of the separate items being stored therein. Memory 150 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

When a storage request is received by caching system 130, it is processed by cache controller 140. Cache controller 140 examines the storage request, determines whether a cache hit or cache miss occurs, updates appropriate status information on caching operations, decides when and which cached blocks to evict, and periodically uses the status information to determine various monitoring metrics for caching system 130. The monitoring metrics may be used to adjust the configuration of caching system 130 or communicated to a user, an operator, and/or another controller.

Cache controller 140 may also forward the storage request to a storage array 160 when a cache miss occurs. Storage array 160 may be coupled to caching system 130 using cabling, one or more connectors, and/or one or more networks. For example, storage array 160 may be coupled to caching system 130 using small computer system interface (SCSI) cabling or through the one or more networks using the internet SCSI (iSCSI) protocol. Storage array 160 may also include one or more storage objects 170. Depending upon how storage array 160 is designed, the storage objects 170 may represent physical storage devices, such as disk drives, or virtualized storage volumes identified by storage unit identifiers like a LUN. Cache controller 140 may also forward other storage requests to storage array 160, such as during prefetch operations or write back operations when a cached block is evicted.

The scope of embodiments is not limited to the structure and arrangement shown in FIG. 1. According to certain embodiments, caching system 130 may be located at different locations in storage system 100. In some examples, caching system 130 may be included in storage controller 120. In some examples, caching system 130 may be a host-side caching system that is located in the same computing device hosting one of the clients 110. In some examples, storage system 100 may include multiple storage controllers in a hierarchy of storage controllers with caching systems being located at one or more of the tiers of the storage controller hierarchy. In some examples, storage system 100 may include multiple caching systems, such as a host-side caching system for each of the clients as well as a caching system for each of the storage controllers.

Figure 2:
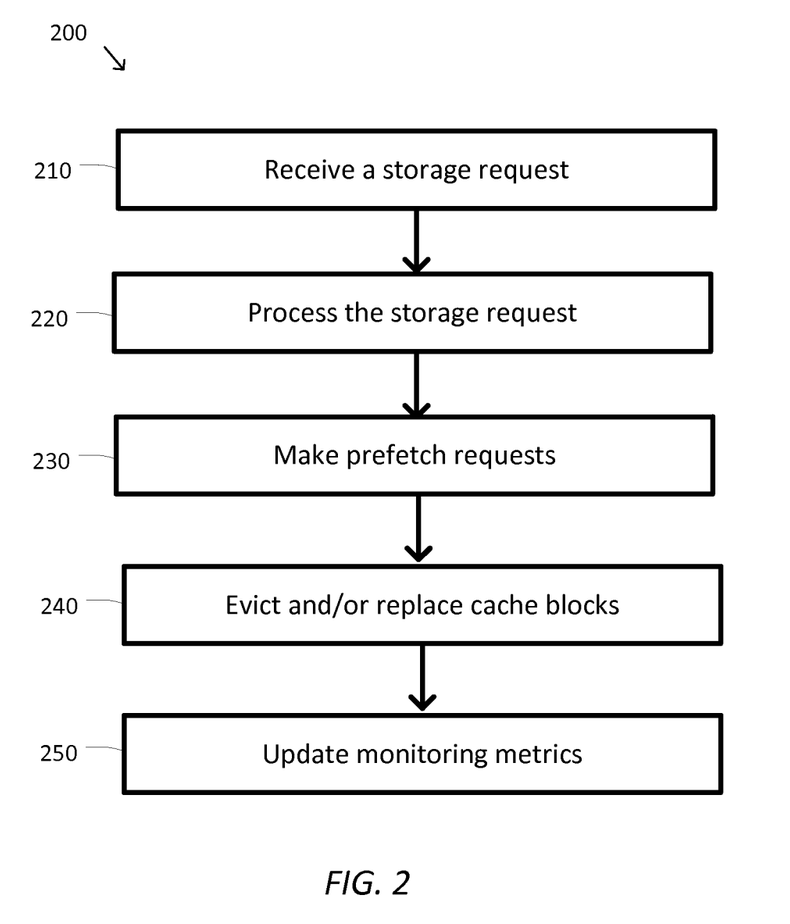
FIG. 2 is a simplified diagram of an example method of caching system operation according to some embodiments.

FIG. 2 is a simplified diagram of an example method 200 of caching system operation according to some embodiments. One or more of the processes 210-250 of method 200 may be implemented, at least in part, in the form of executable code stored on non-transient, tangible, machine readable media that when run by one or more processors (e.g., the one or more processors in cache controller 140) may cause the one or more processors to perform one or more of the processes 210-250. For example, method 200 may be implemented by cache controller 140 on behalf of caching system 130.

At a process 210, a storage request is received. During the processing of most storage requests by a storage system, the storage requests are passed to a caching system, where they are received by the caching system. As each storage request is received it is typically passed to a cache controller where it is examined and further processed by the cache controller. The storage request may be received by the caching system as part of one or more messages.

At a process 220, the storage request is processed. Once the storage request is received during process 210 it is typically examined by the cache controller to determine one or more characteristics of the storage request. For example, the characteristics may include a logical address (e.g., a block number) for the storage associated with the storage request, an identifier for the client making the storage request, a storage unit identifier (e.g., a LUN) for the storage volume being requested, and/or the like. The storage request is also examined to determine whether it is a read request or a write request.

When the storage request is a read request, the cache controller uses the storage unit identifier and the logical address to determine whether the requested data is already stored in the memory of the caching system (i.e., whether a cache hit occurs). When a cache hit occurs, the cache controller accesses the one or more blocks in the memory containing the requested data and returns the requested data as part of a response to the read request. The cache controller may also make one or more updates to a CCB maintained for each of the blocks. The updates may include recording information associated with the time of the read request and/or noting that the block has been read as part of a cache hit. The time information may be used by the cache controller to support the eviction process that is described in further detail below. When a cache miss occurs, the cache controller forwards the read request to a corresponding storage array based on the storage unit identifier. When the results of the read operation are received back from the storage array, one or more blocks are allocated in the memory, the fetched data is stored in the blocks, and a CCB is created for each of the fetched blocks. Each CCB includes at least the corresponding storage unit identifier and block number from the read request. The CCB may further include information associated with the time of the read request and/or the client identifier.

When the storage request is a write request, the cache controller uses the storage unit identifier and the logical address to determine whether the blocks corresponding to the data to be written are already stored in the memory of the caching system. When a corresponding block is already stored in the caching system, the block is updated with the data in the write request. When a corresponding block is not already stored in the caching system, a block is allocated in the memory, the data in the write request is written to the block, and a CCB is created with the CCB including at least the corresponding storage unit identifier and block number from the write request. The cache controller may also make one or more updates to the CCB maintained for each of the blocks. The updates may include recording information associated with the time of the write request and/or noting that the block has been written to. The time information may be used by the cache controller to support the eviction process that is described in further detail below. Further, when the caching system is using a write through style of operation, the write request is also forwarded to the storage array so that the data in the write request may also be stored in the storage array.

At a process 230, one or more prefetch requests may be made. When the caching system supports speculative fetching of storage blocks, the cache controller may also make one or more additional read requests to the storage array based on the storage unit identifier and the block number from the storage request received during process 210. For example, when the storage request includes a read request for block n and the caching system support prefetching of m blocks, the cache controller may make read requests for blocks n+1, n+2, . . . , n+m from the storage array for each of those blocks that isn't already cached. As each of those blocks are received back from the storage array, a block is allocated in the memory, a CCB is created, and the block is stored in the memory. The cache controller may also make one or more updates to the CCB maintained for each of the blocks. The updates may include recording information associated with the time of the prefetch request and/or noting that the block has been cached due to a prefetch request.

At a process 240, one or more cache blocks are evicted and/or replaced. The memory in the caching system for storing blocks is finite in size, meaning that only a certain number of blocks may be cached at one time. After the memory fills and a predetermined cache block limit is reached, the caching system eventually begins evicting or removing blocks so that they may be replaced by blocks from more recent storage requests. Many caching systems use a least recently used (LRU) or related algorithm to select the blocks that are to be evicted. This is where the timing information recorded during processes 220 and/or 230 is used to select a next block to evict. Before a block is evicted, the CCB may be checked to determine whether the block has been previously written to without also performing a write through operation to store the data in the storage array. When the block has been written, but not written through to the storage array, the block is written back to the storage array before it is evicted. The storage unit identifier and logical address in the CCB for the block are used to determine where the block is written back to.

After the block is evicted, the cache controller increments one or more eviction or block counters that are used to track the eviction state of the block at the time of eviction based on the updates made to the CCB during processes 220 and/or 230. In some embodiments, separate eviction counters for each eviction state may be maintained for each tenant of the caching system. In some examples, the respective eviction counters for each tenant may be determined based on the storage unit identifier included in the respective CCB. In some examples, the respective counters for each tenant may be determined based on the client identifier included in the respective CCB. In some cases, respective counters may be kept for each storage unit identifier and/or each client identifier. Use of separate eviction counters for each tenant allows the caching system to monitor whether some tenants are being better served by the caching system than others. In some embodiments, an aggregate eviction counter across the entire caching system may be maintained for each eviction state.

Figure 3:
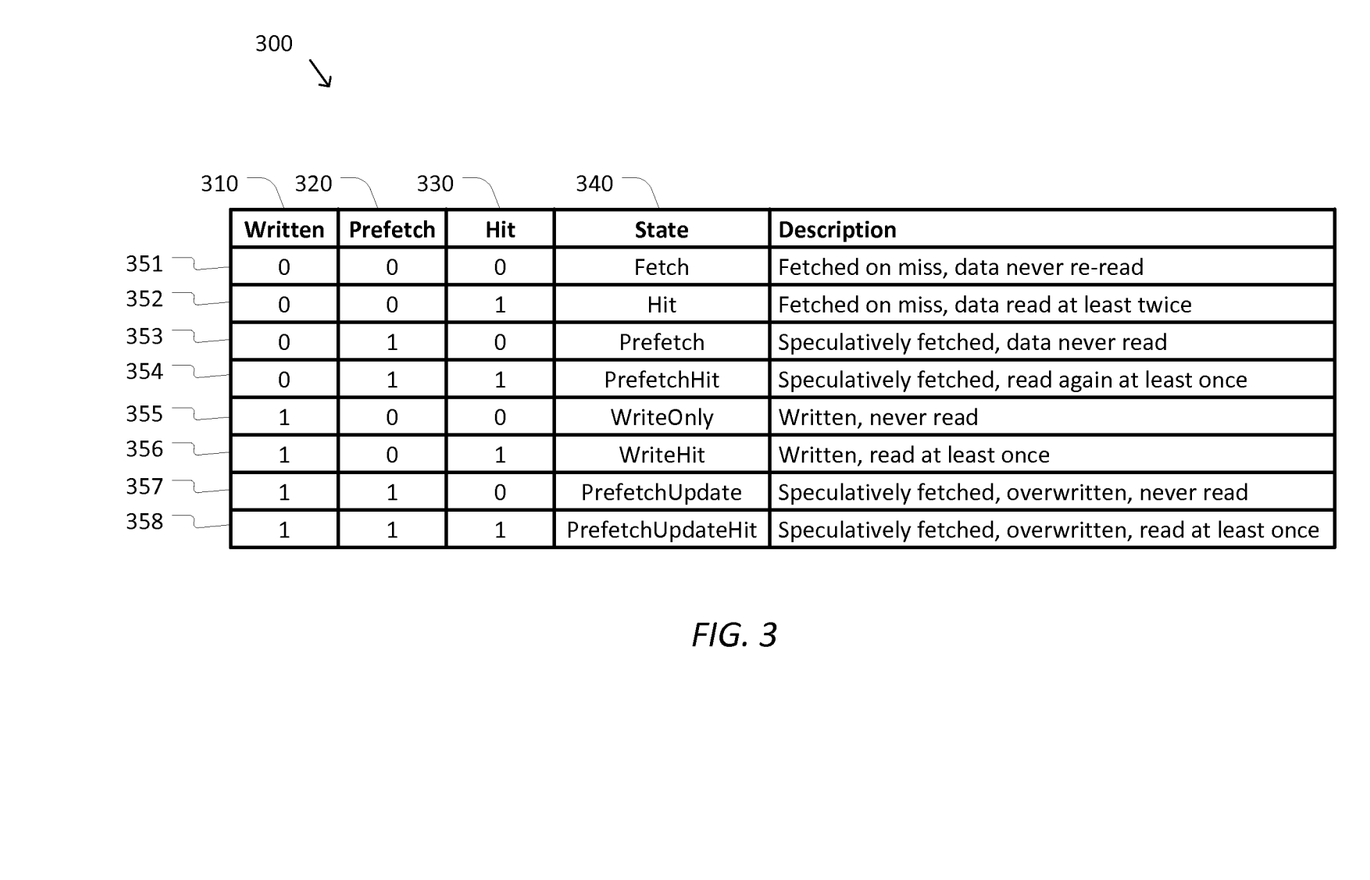
FIG. 3 is a simplified diagram of an example chart of status information that may be included in a cache control block according to some embodiments.

FIG. 3 is a simplified diagram of an example chart 300 of status information that may be included in a cache control block according to some embodiments. As shown in FIG. 3, chart 300 lists three status values, state variables, or status indicators that are included in a CCB and may be used to track how a block associated with the CCB has been accessed in the caching system. The three status values include whether the block has been written to (written status value 310), whether the block was cached as a result of a prefetch (prefetch status value 320), and whether the block has been read at least once after being cached (hit status value 330). The written status value 310 is set whenever a write request is handled during process 220. The prefetch status value 320 is set whenever a block is cached as part of prefetch operation during process 230. And, the hit status value 330 is set whenever a block is accessed as a result of a cache hit during process 220. Combined, the written status value 310, the prefetch status value 320, and the hit status value 330 provide one of eight possible eviction states 340 of the corresponding block. In some embodiments, it may also be desirable to replace the written status value 310 and/or the hit status value 330 with corresponding counters to more robustly track the number of times a cached block has been written to and/or read from. In some examples, the corresponding counter may have maximum count values so that the first number of writes and/or reads are counted.

A Fetch state 351 corresponds to a block that was cached as a result of a cache miss and has not been written to or subsequently read as a result of a cache hit. A block with Fetch state 351 indicates a block that has been cached, but has provided no benefit as a result of being cached.

A Hit state 352 corresponds to a block that was cached as a result of a cache miss, has not been written to, and has been subsequently read as a result of a cache hit. A block with Hit state 352 indicates a block that has been cached and has provided a benefit to responsiveness by supporting at least one subsequent cache hit.

A Prefetch state 353 corresponds to a block that was cached as a result of a prefetch operation and has not been written to or subsequently read as a result of a cache hit. A block with Prefetch state 353 indicates a block that has been speculatively cached, but has provided no benefit as a result of being cached. In general, a block with Prefetch state 353 indicates a wasted storage operation as the prefetched block was not used to satisfy any storage request received by the caching system.

A PrefetchHit state 354 corresponds to a block that was cached as a result of a prefetch operation, has not been written to, and has been subsequently read as a result of a cache hit. A block with PrefetchHit state 354 indicates a block that has been speculatively cached and provided benefit as a result of having been read later. In most cases the prefetch operation used to cache the block allows the subsequent read request for the block to proceed more quickly than it would have had the block been cached as a result of a cache miss. In general, a block with PrefetchHit state 354 indicates a successful prefetch operation.

A WriteOnly state 355 corresponds to a block that was cached as a result of a write operation, but has not been subsequently read as a result of a cache hit. A block with WriteOnly status 355 indicates a block that did not benefit from having been cached except for any possible performance gain that may result from being able to complete the write request more quickly in the caching system without first waiting for the write operation to be forwarded to the storage array.

A WriteHit state 356 corresponds to a block that has been written to and has been subsequently read as a result of a cache hit. A block with WriteHit state 356 indicates either a block that was cached during a write request and subsequently provided benefit during a subsequent read request or a block that was cached as a result of a cache miss and subsequently provided benefit during both a subsequent read request and a subsequent write request.

A PrefetchUpdate state 357 corresponds to a block that was cached as a result of a prefetch operation, has been subsequently written to, and has not been subsequently read as a result of a cache hit. A block with PrefetchUpdate state 357 indicates a block that was speculatively prefetched, but provided marginal benefit for having been cached before a subsequent write request.

A PrefetchUpdateHit state 358 corresponds to a block that was cached as a result of a prefetch operation, has been subsequently written to, and has been subsequently read as a result of a cache hit. A block with PrefetchUpdateHit state 358 indicates a block that was speculatively prefetched and provided benefit when handling both subsequent read and write requests.

Referring back to FIG. 2 and process 240, in some embodiments, when the written status value 310 and/or the hit status value 330 are implemented using counters, the one or more counters associated with the Hit state 352, the PrefetchHit state 354, the WriteOnly state 355, the WriteHit state 356, the PrefetchUpdate state 357, and/or the PrefetchUpdateHit state 358 may be incremented by the amount in the corresponding written status value 310 counter and/or the hit status value 330 counter. Incrementing by these larger counter values may support improved measuring of how each block state contributes to cache hit rates and cache effectiveness.

In some embodiments the caching system maintains a pool of free blocks that are kept free of cached data so that the predetermined cache block limit is less than the total cache block capacity of the memory in the caching system that is reserved for cache blocks. The pool of free blocks helps reduce caching delay as allocated blocks may be taken from the pool of free blocks without waiting for the eviction process to identify a next block to evict and the write back operation on the block finish before storing newly cached data to the block. Thus, when a cache block is allocated during process 220 and/or 230, the eviction and/or write back may begin and when the eviction and/or write back completes, the memory occupied by the evicted block is added to the pool of free blocks.

At a process 250, monitoring metrics are updated. The cache controller may periodically update one or more monitoring metrics or statistics for the caching system. To avoid introducing transient effects in the monitoring metrics caused by short-term fluctuations in the use of the storage system and the caching system, the monitoring metrics are typically measured and/or collected at periodic time intervals, often referred to as epochs. Epochs are typically of longer duration than most storage operations so that the averaging effects of monitoring over time provide a better overall measure of the caching system. A typical epoch may vary in length from 100 ms to several minutes or longer.

In some embodiments, when monitoring metrics are derived from count values being maintained by the caching system, the count values may be reset at the beginning of each monitoring epoch and then read at the end of each monitoring epoch. In some embodiments, the count values may be kept in free running counters where a change in the count value from the previous monitoring epoch is used to determine a count value for the current epoch. For example, the count values that are determined with each monitoring epoch may correspond to the counts of each block state that are updated when each block is evicted from the cache during process 240.

In some embodiments, the monitoring metrics may be shared. In some examples, the cache controller may transmit one or more messages to an operator, a user, and/or a log with some or all of the metric values. In some examples, the cache controller may transmit the one or more messages to another controller in the storage system that may use the metrics to tune the behavior of the caching system and/or the storage system.

In some embodiments, the monitoring metrics may also be aggregated over multiple epochs. In some examples, a sliding window with metric values from each of the last x number of epochs may be retained with averages over the last x epochs being determined. For example, x could be 4, with 4 versions of each metric being retained. In some examples, an exponential smoothing or other aggregating approach may be used to retain partial metric information over recent epochs without maintaining multiples of each metric value.

Figure 4:
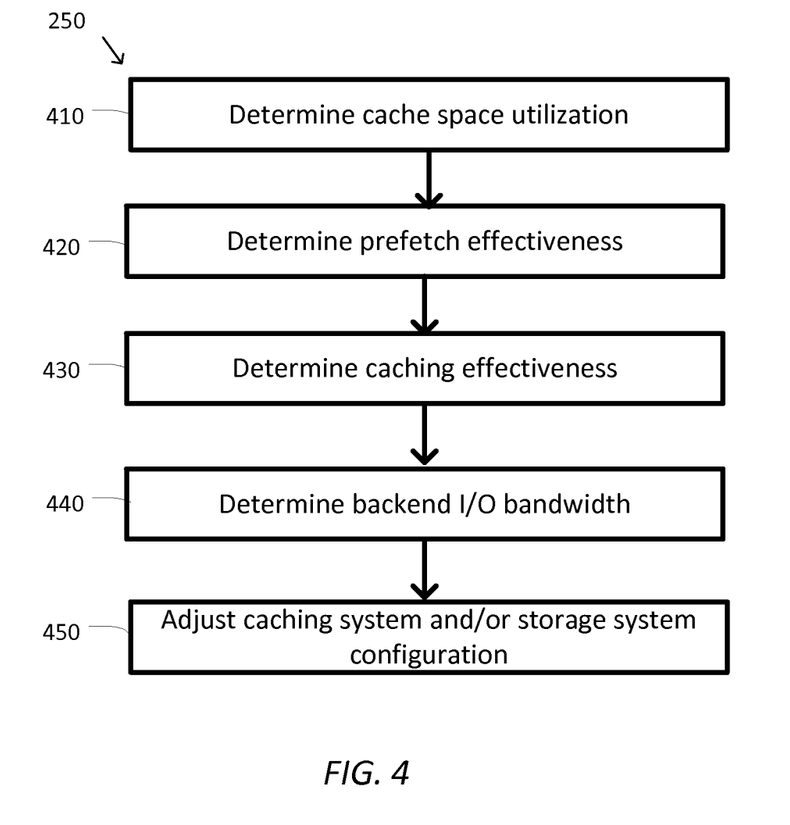
FIG. 4 is a simplified diagram of an example process of updating caching metrics according to some embodiments.

FIG. 4 is a simplified diagram of an example process 250 of updating caching metrics according to some embodiments. One or more of the processes 410-450 of process 250 may be implemented, at least in part, in the form of executable code stored on non-transient, tangible, machine readable media that when run by one or more processors (e.g., the one or more processors in cache controller 140) may cause the one or more processors to perform one or more of the processes 410-450. For example, process 250 may be implemented by cache controller 140 on behalf of caching system 130 with process 250 being performed at each monitoring epoch. In some embodiments, a subset of the caching metrics may be updated based on the aspects of the caching system that are to be monitored.

At a process 410, a cache space utilization may be determined. As a caching system receives and processes storage requests, an amount of space used by each of the tenants in the caching system may ebb and flow based on the patterns of usage in the storage requests. Each of the tenants may correspond to either each of the storage units being requested in the storage requests and/or each of the clients making storage requests.

Cache space utilization for each of the tenants may be determined by examining each of the CCBs present in the caching system at any given time as each CCB corresponds to a block that is stored in the memory of the caching system. By examining the tenant information included in each of the CCBs, a count of a number of blocks corresponding to each tenant may be determined. In some embodiments, the count for each tenant may be determined at the end of each monitoring epoch by iterating through the CCBs and incrementing each corresponding count value based on the tenant information. In some embodiments, the counts may be maintained in real time by incrementing a corresponding block count when a CCB is created during processes 220 and/or 230 and decrementing a corresponding block count when a CCB is destroyed during process 240. In some examples, the incrementing and decrementing may be handled by the constructor and destructor, respectively, of a CCB class. By comparing each count value to a total number of blocks that may be cached and/or a total number of blocks that are currently being cached, the cache space utilization for each tenant may be determined. The total of cache space utilizations over all tenants is 100% or less and may be adjusted to account for the size of the pool of free blocks.

The cache space utilization metrics may be used to determine whether there is good balance in the use of the caching system by the various tenants. When the cache space utilization metrics for each of the tenants are relatively similar, good balance between the tenants is being maintained. When the cache space utilization metrics for each tenant are less similar, or the cache space utilization for one or more of the tenants is significantly higher than the others, an imbalance in cache usage across the tenants is present. When an imbalance is detected the cache space utilizations may be used to rearrange storage resources to achieve better caching balance. In some examples, the cache space utilization metrics may also be used to partition the caching system so that different tenants are permitted to cache up to a pre-assigned number of blocks.

At a process 420, prefetch effectiveness may be determined. The counters associated with Prefetch state 353, PrefetchHit state 354, PrefetchUpdate state 357, and PrefetchUpdateHit state 358 (the prefetch counters) may be used to determine the effectiveness of the prefetch operations of the caching system. Prefetch effectiveness may be determined on a per tenant basis and/or as a whole across the entire caching system depending on whether prefetch counters for each tenant are maintained.

In some embodiments, the counter(s) associated with Prefetch state 353 may be used to estimate how much storage system resources are being wasted on prefetch operations that result in no benefit to the storage system. In some examples, each block that is prefetched and never again used consumes both network bandwidth as well as storage array and storage device bandwidth that could be available for other storage system operations. In some examples, speculatively caching these blocks results in more block evictions and may also indirectly reduce the hit rate for the caching system because delaying the eviction of some blocks may result in more cache hits for those blocks. A higher amount of wasted resources may suggest that the number of blocks (i.e., the value of m) being speculatively prefetched be reduced during process 230, whereas a lower amount of wasted resources may suggest that the number of blocks being speculatively prefetched be increased during process 230.

In some embodiments, the counter(s) associated with Prefetch state 353 may be compared to the other prefetch counters to determine a prefetch hit rate. For example, the prefetch hit rate may correspond to the ratio of the total of PrefetchHit state 354, PrefetchUpdate state 357, and PrefetchUpdateHit state 358 counters to the total of the prefetch counters. A higher prefetch hit rate indicates a more effective speculative caching approach. A lower prefetch hit rate may suggest that the number of blocks (i.e., the value of m) being speculatively prefetched be reduced during process 230, whereas a higher prefetch hit rate may suggest that the number of blocks being speculatively prefetched be increased during process 230.

At a process 430, caching effectiveness may be determined. The cache states of FIG. 3 may generally be divided into three categories indicating how effectively the caching system is caching blocks. Cache blocks that are evicted when in the Fetch state 351 and the Prefetch state 353 are ill-used blocks as they take up cache space, but do not improve the hit rate. Cache blocks that are evicted when in the Hit state 352, the Prefetch hit state 354, the WriteHit state 356, the PrefetchUpdate state 357, and the PrefetchUpdateHit state 358 are well-used blocks as they contribute to a higher hit rate. Cache blocks that are evicted when in the WriteOnly state 355 may provide insight into the write cache effectiveness. The counters associated with the ill-used, well-used, and write-only blocks may be converted to ill-used, well-used, and write-only caching shares by dividing them by a total of all of the counters. The ill-used, well-used, and write-only cache shares may be determined separately for each tenant and/or as a whole across the entire caching system depending on whether eviction counters for each tenant are maintained.

In some embodiments, caching effectiveness may be improved by shifting caching resources between tenants based on the ill-used, well-used, and write-only cache shares. In some examples, caching effectiveness may be improved by shifting caching resources from tenants with a higher ill-used cache share to tenants with a higher well-used cache share, thus providing extra caching resources to the tenants with higher hit rates who are more likely to contribute storage system performance overall. Similarly, caching effectiveness may be improved by shifting caching resources from tenants with a higher write-only cache share to tenants with a higher well-used cache share.

In some embodiments, when the written status value 310 is implemented using a counter, an average of the written state values 310 across each of the evicted blocks may provide insight into the write policy for each tenant or the caching system as a whole. When the average is high, the respective tenant or the caching system as a whole may be better served using a write back caching policy where blocks associated with write requests are written to the storage array upon eviction. When the average is low and/or close to one, a write through caching policy, where data written to the blocks is also written to the storage array with each write, is less likely to consume excess storage system resources.

At a process 440, backend I/O bandwidth is determined. Backend I/O bandwidth is a measure of how much data traffic is being handled by each storage array and the storage units in the storage array. Backend I/O bandwidth may be estimated by measuring the eviction rate for each storage unit/tenant. By totaling the eviction counters for each tenant and accounting for block size and epoch length, the backend I/O bandwidth may be determined. In some embodiments, comparison of backend I/O bandwidth from each of the tenants may support better load balancing among the storage devices associated with each of the storage units as storage units may be moved among the storage devices to better distribute the backend I/O bandwidth. In some embodiments, moving storage units with higher backend I/O bandwidths to faster storage devices may also improve storage system performance.

At a process 450, the caching system and/or storage system configurations may be adjusted. Using the metrics monitored during processes 410-450, the configurations of the caching system and/or the storage system may be adjusted to achieve better overall caching system and/or storage system performance. In some embodiments, the cache space utilization determined during process 410 may be used to partition and/or adjust how caching resources are made available to each of the tenants to adapt to imbalances in the cache space utilization between the tenants. In some embodiments, the prefetch effectiveness determined during process 420 may be used to adjust the number of blocks speculatively prefetched so that fewer storage system resources are wasted prefetching blocks that are not accessed again in the caching system before they are evicted. In some embodiments, the caching effectiveness determined during process 430 may be used to adjust how caching resources are made available to each of the tenants by moving caching resources to those tenants who are more likely to derive a benefit from cached blocks. The caching effectiveness may also be used to determine whether a write through or a write back policy be used for each tenant. In some embodiments, the backend I/O bandwidths determined during process 440 may be used to move storage units between storage devices so that storage units with higher backend I/O bandwidths may be moved to storage devices which are faster and/or have more bandwidth available.

Some examples of caching system 130 may include non-transient, tangible, machine readable media that include executable code that when run by one or more processors may cause the one or more processors (e.g., the one or more processors in cache controller 140) to perform the processes of method 200 as described above. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
storing, by a cache controller, storage blocks in a cache memory, each of the storage blocks being associated with its own status indicators including a written status indicator, a prefetched status indicator, and a hit status indicator;
as requests are received at the cache controller:
processing the requests; and
updating the status indicators associated with the storage blocks in response to the processing of the requests;
selecting one of the storage blocks for eviction when a storage block limit is reached;
as the selected storage block is evicted from the cache memory, determining an eviction state of the selected storage block based on values of the status indicators associated with the selected storage block and updating a selected one of a plurality of block counters, the selected one of the block counters corresponding to the eviction state; and
periodically updating caching statistics based on the block counters.

2. The method of claim 1 wherein:
each of the storage blocks is associated with a tenant identifier; and
the method further comprises updating the selected one of the block counters further based on the tenant identifier associated with the selected storage block.

3. The method of claim 1, further comprising updating the written status indicator associated with the storage blocks that are accessed by a write request.

4. The method of claim 3 wherein:
the written status indicator is a written counter; and
updating the written status indicator comprises incrementing the written counter.

5. The method of claim 1, further comprising updating the hit status indicator associated with the storage blocks that are accessed by a read request that results in a cache hit.

6. The method of claim 5 wherein:
the hit status indicator is a read counter; and
updating the hit status indicator comprises incrementing the read counter.

7. The method of claim 1 wherein:
each of the storage blocks is associated with tenant information; and
selecting the selected one of the block counters is further based on respective tenant information associated with the selected storage block.

8. The method of claim 1 wherein:
each of the storage blocks is associated with tenant information; and
the tenant information is a client identifier or a storage unit identifier.

9. The method of claim 1 wherein updating the caching statistics comprises determining a cache space utilization based on a ratio of a number of the storage blocks that are associated with each tenant stored in the cache memory and a number of the storage blocks stored in the cache memory.

10. The method of claim 1 wherein updating the caching statistics comprises determining a back end input output bandwidth based on a total of the block counters.

11. The method of claim 1 wherein:
processing the requests comprises:
fetching prefetched storage blocks based on the requests; and
updating the prefetch status indicator associated with the prefetched storage blocks.

12. A computing device comprising:
a memory containing machine readable medium comprising machine executable code having stored thereon instructions for performing a method of caching; and
a processor coupled to the memory, the processor configured to execute the machine executable code to cause the processor to:
as storage requests are received to access cache blocks, update status values associated with each of the cache blocks accessed by the storage requests in response to processing the storage requests, each of the cache blocks having its own status values including a written status value, a prefetched status value, and a hit status value;
select one of the cache blocks for eviction when a cache block limit is reached;
as the selected cache block is evicted from the memory, determine an eviction state of the selected cache block based on values of the status values associated with the selected cache block and update a selected one of a plurality of eviction counters, the selected one of the eviction counters corresponding to the eviction state; and
periodically update caching system metrics based on the eviction counters.

13. The computing device of claim 12 wherein:
each of the cache blocks is associated with tenant information; and
the processor is further configured to update the selected one of the eviction counters based on the tenant information associated with the selected cache block.

14. The computing device of claim 12, wherein the processor is further configured to:
determine a cache effectiveness metric based on comparisons of one or more combinations of the eviction counters; and
determine a prefetch effectiveness metric based on one or more of the eviction counters associated with the prefetch status value.

15. A method comprising:
processing, by a caching system, a plurality of storage requests received by the caching system;
updating state variables for blocks of data that are accessed by the storage requests, the state variables for each of the blocks of data include a written state variable, a prefetch state variable, and a hit state variable;
as each block of data is evicted from the caching system, determining an eviction state of the evicted block of data based on values of the state variables associated with the evicted block of data and updating a selected one of a plurality of caching metrics, the selected one of the caching metrics corresponding to the eviction state; and
adjusting one or more characteristics of the caching system based on the caching metrics.

16. The method of claim 15, further comprising aggregating the caching metrics over multiple periods of time.

17. The method of claim 15 wherein:
generating the caching metrics comprises determining a cache effectiveness metric based on comparisons of one or more combinations of counters, each of the counters being associated with at least one possible eviction state; and
adjusting the one or more characteristics of the caching system comprises shifting caching system resources to tenants with a higher cache effectiveness metric.

18. The method of claim 15 wherein:
generating the caching metrics comprises determining a prefetch effectiveness metric based on one or more of the caching metrics associated with values of the prefetch state variable; and
adjusting the one or more characteristics of the caching system comprises adjusting a number of blocks speculatively fetched in response to a read request based on the prefetch effectiveness metric.

19. The method of claim 15 wherein:
generating the caching metrics comprises determining a cache space utilization metric based on a ratio of a number of blocks of data stored in the caching system that are associated with each tenant of the caching system and a number of blocks of data stored in the caching system; and
adjusting the one or more characteristics of the caching system comprises limiting a number of blocks of data that the caching system may be allowed to store for each tenant of the caching system when the cache space utilization metric shows an imbalance in cache system use among tenants of the caching system.

* * * * *